US007669338B2

(12) United States Patent  
Allen, Jr.

(10) Patent No.: US 7,669,338 B2
(45) Date of Patent: Mar. 2, 2010

(54) RANGE FINDER

(76) Inventor: John H. Allen, Jr., 17 Runaround Pond Rd., Durham, ME (US) 04222

( * ) Notice: Subject to any disclaimer, the term of this patent is extended or adjusted under 35 U.S.C. 154(b) by 19 days.

(21) Appl. No.: 11/957,038

(22) Filed: Dec. 14, 2007

(65) Prior Publication Data

US 2009/0151177 A1    Jun. 18, 2009

(51) Int. Cl.
 *G01C 3/02* (2006.01)
(52) U.S. Cl. ............... 33/265; 33/277; 124/87; D10/70
(58) Field of Classification Search ............ 33/265, 33/274, 276, 277, 1 SB, 1 SD; 124/87–88; D10/70
 See application file for complete search history.

(56) References Cited

U.S. PATENT DOCUMENTS

| 2,519,727 | A | | 8/1950 | Yezdan | |
| 3,409,987 | A | | 11/1968 | New | |
| 3,455,027 | A | * | 7/1969 | Perkins | 33/265 |
| 3,907,288 | A | * | 9/1975 | Hudak | 33/277 |
| 6,405,442 | B1 | | 6/2002 | Ratcliff | |
| 6,636,296 | B1 | | 10/2003 | Faulkner et al. | |

OTHER PUBLICATIONS http://bestbuyhomepage.com/501_carson_golf_range_finder.htm, 1 page, Aug. 6, 2007.
http://www.afinercrass.com/afinerproduct/sports-recreational/carson-. . . , 2 pages, Aug. 6, 2007.
http://yahoo.shoptoit.ca/shop/product_catId_1001262_productId_. . . , 1 page, Aug. 6, 2007.

* cited by examiner

*Primary Examiner*—Yaritza Guadalupe-McCall
(74) *Attorney, Agent, or Firm*—Patricia M. Mathers

(57) ABSTRACT

Range finder for determining the distance between the user and an object of known height or width, such as a golf flagstick, structure, etc. The range finder is a flat card, having a series of graduated apertures, each aperture being dimensioned to correspond to a particular distance to the flagstick. Range information is provided for each aperture. The user holds the card 24 inches from the eye and sights the flagstick through the apertures. The range information for the aperture whose diameter most closely corresponds to the height of the sighted flagstick is the actual distance between the user and the flagstick. The apertures are graduated in size, to represent range information in specific increments. The size of the increments is selected to facilitate optimal performance and may vary within a series of apertures.

9 Claims, 3 Drawing Sheets

RANGE FINDER

BACKGROUND INFORMATION

1. Field of the Invention

The invention relates to the field of range finding. More particularly, the invention is a range finder to determine a distance between the user and a single object. More particularly yet, the invention is a range finder for golfers, to determine the distance of a flagstick that marks a particular golf hole.

2. Description of the Prior Art

A golfer uses the same basic swing, typically, for hitting a golf ball any distance, other than putting. Many golfers use ¾, ½, ¼ swings at ranges that are under 75 yards for pitch or chip shots. The golf club size exerts a major influence on how far the golf ball will travel. It is crucial, therefore, that the golfer know the distance to the flagstick or pin, so that he or she may choose the proper combination of club and swing.

Golf range finders are known and are often used by golfers, to determine the distance to the flagstick, also referred to as a pin, that marks the particular golf hole. Some more recently developed golf range finders are digital optical devices with magnifying lenses. The user looks through the device, aligns the digital range marks with the flag pin, and the device indicates the distance to the flagstick. These devices have certain disadvantages. They are bulky and add weight to the already heavy golf equipment; they often require batteries, which run down and need replacing; and they can be quite expensive.

More typically, golf range finders have been provided in the past as look-through cards or plates, with some system of a linear scale or graduated line markings along an aperture, that allows the user to judge the distance of the flagstick or the cup. U.S. Pat. No. 3,409,987 is illustrative of this type of golf range finder. The card has an aperture formed by a base line at the bottom and a distance line at the top that curves upward at one end. Holding the card approximately 24 inches from the eye, the user sights the flagstick and moves the card until the upper and lower ends of the flagstick just fit inside the aperture. The base line has a scale on it, indicating a plurality of positions that represent 10 yard distances. Depending on where along the aperture the flagstick fits between the base line and the distance line, the user can see that the flagstick is 80, 90, 100, . . . 200 yards away and is then able to select the appropriate club.

These cards have a disadvantage in that they have a single aperture with a graduated scale and it is often difficult for the user to determine or to interpolate the distance of the flagstick, or to remember exactly where the flagstick was, once he pulls the card closer, to look at the range information provided on the card.

What is needed, therefore, is a device that is inexpensive to manufacture, small and easy to carry, and that provides a clear, quick, and easy method of determining the distance of a flagstick.

BRIEF SUMMARY OF THE INVENTION

The invention is a card comprising a series of apertures that are graduated in size. The sizes of the apertures are developed to indicate a range distance for a particular object, the object having a known or estimated height or width. Although the range finder may be developed for many different uses, such as determining the distance to a structure, telephone pole, etc., the invention will be described herein, by way of illustration only, as a range finder to be used by a golfer to determine the distance between the user and a flagstick. The apertures are sized to indicate the range of a flagstick that has a height of 78 inches. Distance or range information is provided on the card for each aperture. The user holds the card at eye level, approximately 24 inches from the eye. The user then sights the flagstick through the apertures and manipulates the card until finding the aperture with a diameter that corresponds closest to the sighted height of the flagstick. One simple method of identifying the particular aperture is to put one's thumb over it. The user then brings the card to a more natural reading position to read the range information for the particular aperture, without losing track of just exactly where the flagstick was properly sighted and measured.

Any number of apertures may be provided on the card, depending on its intended use. A typical series of apertures, for example, would encompass a range between 50 and 200 yards, typically in 10 yard increments, although the size of the increments may vary within a series. The range information associated with each aperture is ideally printed next to the aperture.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
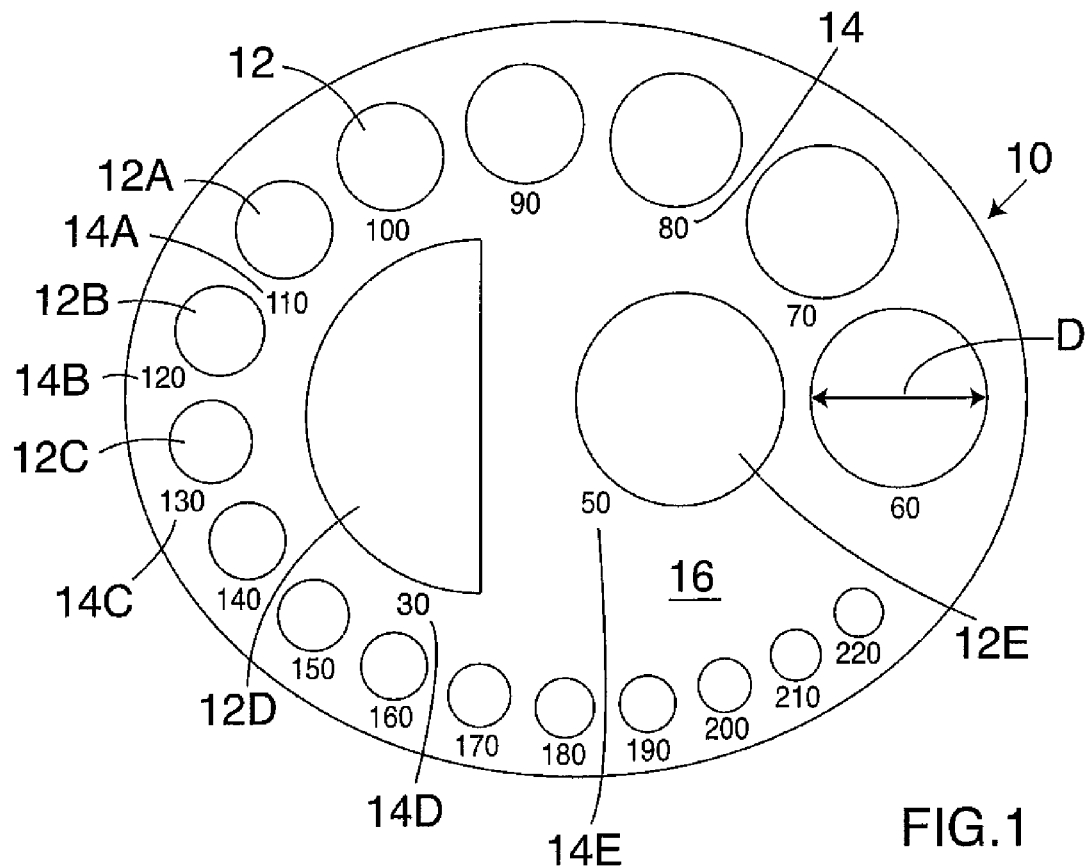
FIG. 1 is a top plane view of the golf ranger finder according to the invention.
Figure 2:
FIG. 2 is a side elevational view of the golf range finder.
Figure 4:
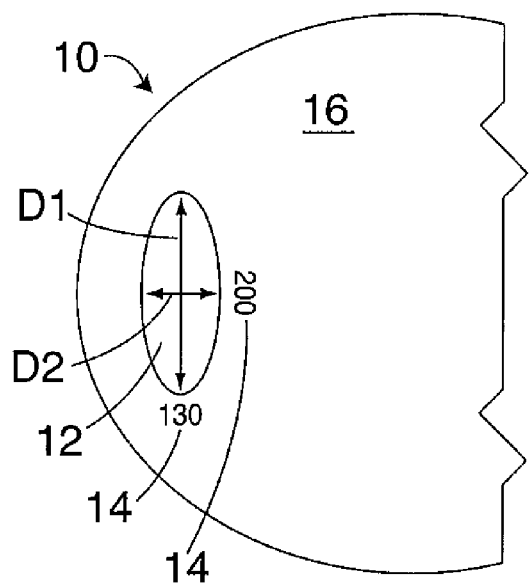
FIG. 4 is an illustration of oval apertures.
Figure 5:
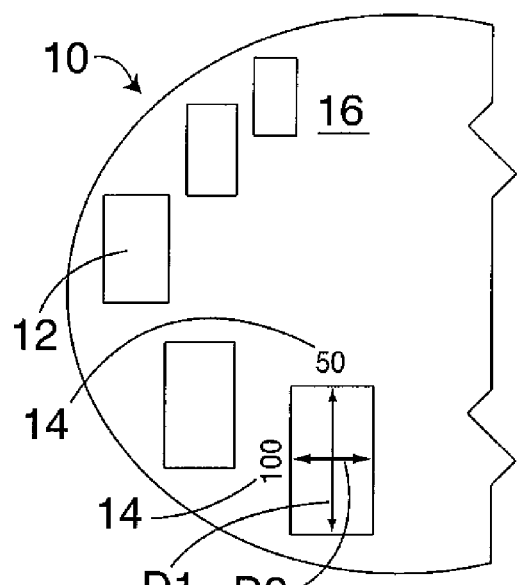
FIG. 5 is an illustration of rectangular apertures.
Figure 6:
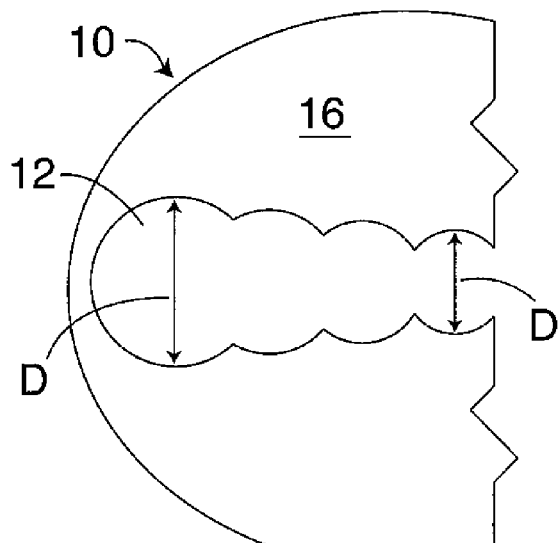
FIG. 6 is an illustration of overlapping apertures.
Figure 7:
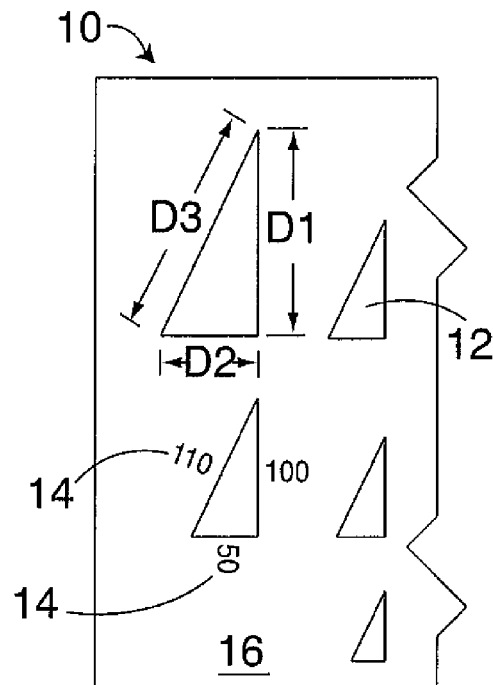
FIG. 7 is an illustration of triangular apertures.
Figure 8:
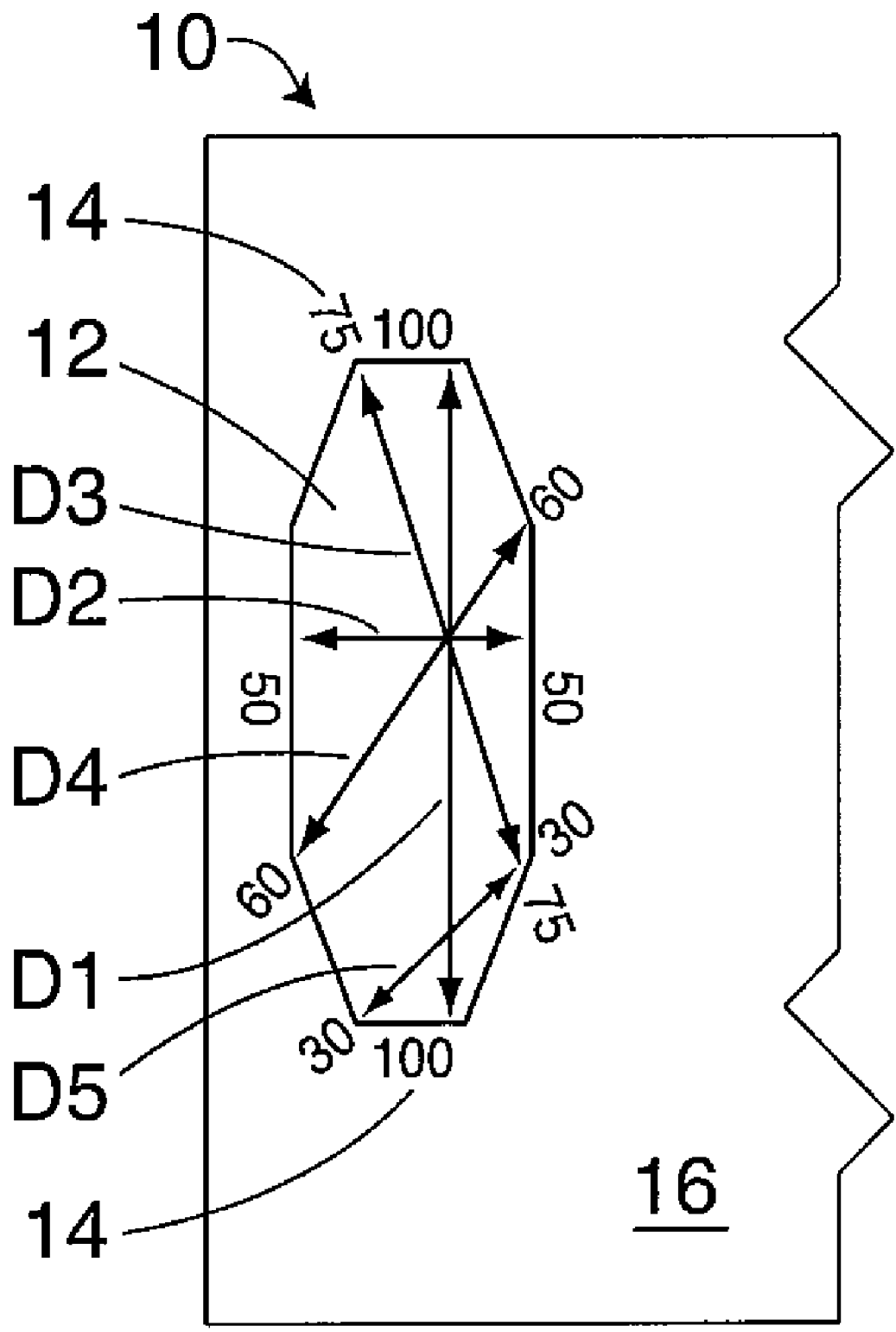
FIG. 8 is an illustration of a non-regular polygon aperture.

FIG. 1 illustrates a visual range finder 10 according to the invention. The range finder 10 is essentially a card or plate 16, having a series of graduated apertures 12. Each aperture 12 is sized to indicate a range distance of an object that is sighted through the aperture. For purposes of illustration on, the ranger finder 10 shall be described hereinafter as being used as a range finder by a golfer, whereby the object that is sighted through the apertures is a flagstick F. It is understood, however, that a range finder developed according to the invention may be used to determine the distance of other types of objects of known height or width, such as cell phone towers, telephone poles, structures, ships, etc., or objects of estimated size, such as persons, animals, etc. FIG. 2 is a side elevational view of the preferred embodiment of the range finder 10, which shows that the card 16 is flat and thin. Each aperture 12 has a dimension D. In the preferred embodiment shown, the apertures 12 are circles and the dimension D is the diameter. The apertures 12 are shown, distinctly separated from each other, but it is also possible to overlap them, as a space-saving measure, as shown in FIG. 6. The preferred embodiment uses circular apertures 12 because of certain advantages provided by the resulting dimension D that is uniform, regardless of the orientation of the card 16. For example, the card 16 may be freely rotated to find the appropriate aperture 12, without the user having to be sure that a particular orientation is maintained in order to obtain a reliable reading. Furthermore, even if the flagstick F is not precisely vertical, the circular aperture 12 will still provide a reliable reading. The circular aperture has the additional advantage of allowing the user to use an aperture to sight objects in the vertical or horizontal direction, i.e., it is not necessary to have separate apertures for sighting objects in the vertical direction and in the horizontal direction. It is understood, however, that other shapes may be suitable for use as the apertures 12, such as, for example, ovals or rectangles. Many shapes may be suitable for representing two or more dimensions with one aperture 12. For example, a rectangular and oval shapes have a clearly defined first dimension D1 and a second dimension D2. Sighting the flagstick F through the first dimension D1 will provide a first range information 14 and sighting it through the second dimension D2 on the same aperture 12 will provide a second, different range information 14. For example, the first dimension D1 is defined by the distance of the major axis of the oval and the second dimension D2 defined by the minor axis of the oval, as shown in FIG. 4. In the case of a rectangle, the first dimension D1 is defined by the distance between two opposing sides that define the length of the rectangular shape and the short distance D2 by the distance between the two opposing sides that define the width of the rectangular shape, as shown in FIG. 5. This use of a dual-range or multi-range aperture 12 may be applied analogously to myriad other shapes that contain clearly defined and dimensionally different areas within one aperture, such as stars or starbursts, undulating or wavy apertures, etc. FIGS. 5, 7, and 8 provide additional examples of shapes that are suitable to serve as apertures 12 and that may have two or more dimensions, which are designated as D1, D2, D3, D4, D5, . . . $D_N$. FIG. 5 shows a partial card 16 of range finder 10 with apertures 12 that are rectangles, having a long dimension D1 and a short dimension D2. FIG. 7 illustrates apertures 12 that are right triangles, each side of the triangle having a different dimension D1, D2, and D3. FIG. 8 shows a partial card 16 of range finder 10 with an aperture 12 that is a non-regular polygon, representing five different dimensions D1-D5.

Range information 14 is associated with each aperture 12. The individual apertures 12 in the series are dimensioned such, that each one represents a particular distance. For purposes of illustration, individual apertures 12A-12E are identified as having corresponding distance information 14A-14E. Each aperture 12 in FIG. 5 contains range information for two different ranges. Analogously, each aperture in FIG. 7 has range information for three different ranges and ea one in FIG. 8 has range information for five different ranges. One of the apertures 12 in FIG. 7, for example, is associated with range information 14 that corresponds to 110 yards, 100 yards, and 50 yards.

Figure 3:
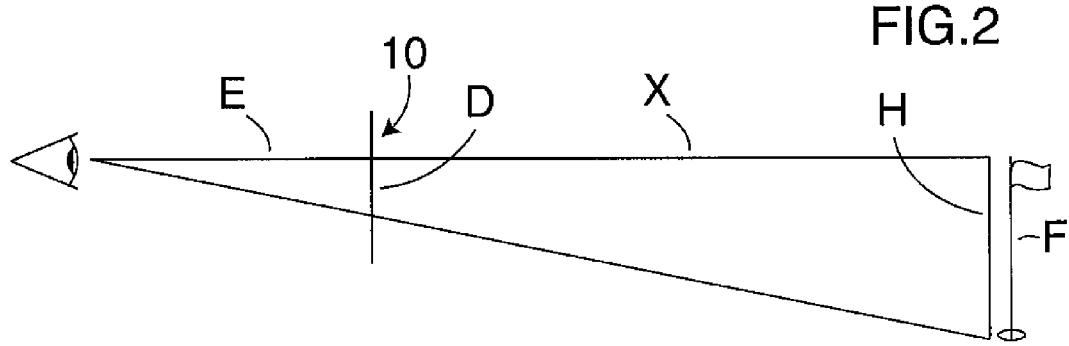
FIG. 3 is a schematic illustration of how the range finder works.

FIG. 3 illustrates the use of the range finder 10. The user wants to determine the total distance between himself and a particular object of known height, in this case, a flagstick F. The user holds the range finder 10 at eye level, a first distance E away from the user's eye. The user now manipulates the range finder 10 until he finds the particular aperture 12 in which the upper and lower ends of the flagstick F, i.e., the height H of the flagstick F, just fit within its dimension D. The corresponding range information 14 for each aperture 12 is ideally printed on the card 16, in close proximity to the particular aperture 12. Thus, for example, if the height H of the flagstick F just fits within a first aperture 12A, the user reads range information 14A from the card, which, in the example shown, is 110 yards.

The dimensions D of the individual apertures have been selected to accommodate the height H of the flagstick F at specific distances from the user. It is deemed generally useful, to present range information 14 in ten-yard increments, for example, 200 yards, 190 yards, 180 yards, etc., although it is possible and may be desirable to present range information 14 in any increments that facilitate optimal performance. In the embodiment shown, the largest aperture 12D represents a range information 14D of 30 yards. The next larger aperture 12E represents a range information 14E of 50 yards. All the remaining apertures 12 represent range information 14 in even increment steps of 10 yards. The appropriate dimensions D of the individual apertures 12 are derived from the following algorithm:

$$D=HE/(E+X),$$

whereby H is the height of the flagstick F; E is the distance of the range finder 10, that is, the aperture 12 from the eye; and X is the distance of the range finder 10 from the flagstick F.

It is understood that the embodiments described herein are merely illustrative of the present invention. Variations in the construction of the golf range finder may be contemplated by one skilled in the art without limiting the intended scope of the invention herein disclosed and as defined by the following claims.

What is claimed is:

1. Range finder for determining the distance of an object of a known or estimated object dimension, said range finder comprising:
   a card;
   a series of apertures on said card, each aperture having a shape that provides two or more dimensions, a first dimension corresponding to a visual sighting of said object at a first distance from said card, a second dimension corresponding to a visual sighting of said object at a second distance from said card, said first distance being different from said second distance; and
   a set of range information data on said card for said each aperture, said set of range information data including a first range information that relates to said first distance and a second range information that relates to said second distance that are indicated by said aperture.

2. The range finder of claim 1, wherein said apertures on said card are rectangular and said first dimension is a distance defined by a length of said rectangle and said second dimension is a distance defined by a width of said rectangle.

3. The range finder of claim 1, wherein said apertures on said card are oval and said first dimension corresponds to a major axis of said oval and said second dimension corresponds to a minor axis of said oval.

4. The range finder of claim 3, wherein said triangle is a scalene triangle.

5. The range finder of claim 1, wherein said shape of said apertures is a triangle, each leg of said triangle having a different dimension.

6. The range finder of claim 5, wherein said triangle is a right triangle.

7. The range finder of claim 1, wherein said shape is a non-regular polygon that provides four or more dimensions, each dimension of said four or more dimensions representing a different range information.

8. The range finder of claim 1, wherein said apertures are distinctly separate from one another.

9. The range finder of claim 1, wherein said apertures overlap each other.

* * * * *